United States Patent [19]

Ozaki

[11] 4,326,757

[45] Apr. 27, 1982

[54] BEARING DEVICE FOR ROTARY MACHINES

[75] Inventor: Sozaburo Ozaki, Ibaraki, Japan

[73] Assignee: Hitachi, Ltd., Tokyo, Japan

[21] Appl. No.: 154,024

[22] Filed: May 28, 1980

[30] Foreign Application Priority Data

May 29, 1979 [JP] Japan .................................. 54-65618

[51] Int. Cl.³ ............................................. F16C 33/10
[52] U.S. Cl. .................................... 308/121; 308/125; 308/132; 310/90
[58] Field of Search ................ 308/22, 121, 125, 132; 310/90

[56] References Cited

U.S. PATENT DOCUMENTS

| 2,644,728 | 7/1953 | Ingalls | 308/22 |
| 2,979,779 | 4/1961 | Staak | 308/132 |
| 3,224,819 | 12/1965 | Hunt | 308/132 |
| 3,434,765 | 3/1969 | Abel | 308/132 |
| 3,870,383 | 3/1975 | Morisaki | 308/125 |
| 3,885,176 | 5/1975 | Cunningham | 308/125 |
| 3,900,234 | 8/1975 | Roddy | 310/90 |
| 4,055,370 | 10/1977 | Cunningham | 308/132 |

*Primary Examiner*—Richard R. Stearns
*Attorney, Agent, or Firm*—Craig and Antonelli

[57] ABSTRACT

A bearing device having a sleeve bearing for small-sized dynamic electric machines, comprising a bearing support member of a rotary shaft supporting end bracket, and an inside annular projection which has a plurality of groove type inside oil reservoirs in the inner circumferential surface thereof and which is formed integrally with the bearing support member by a die casting mold. These inside oil reservoirs are provided in the same circumferential positions as oil returning bores in the bearing support member so as to be linearly communicated therewith. Owing to this construction, inner caps on the bearing support member, which are essential to a conventional bearing device of this kind, can be omitted. This allows the number of parts and the number of manufacturing steps to be reduced, and oil leak from inside caps as in a conventional bearing device can be prevented.

4 Claims, 5 Drawing Figures

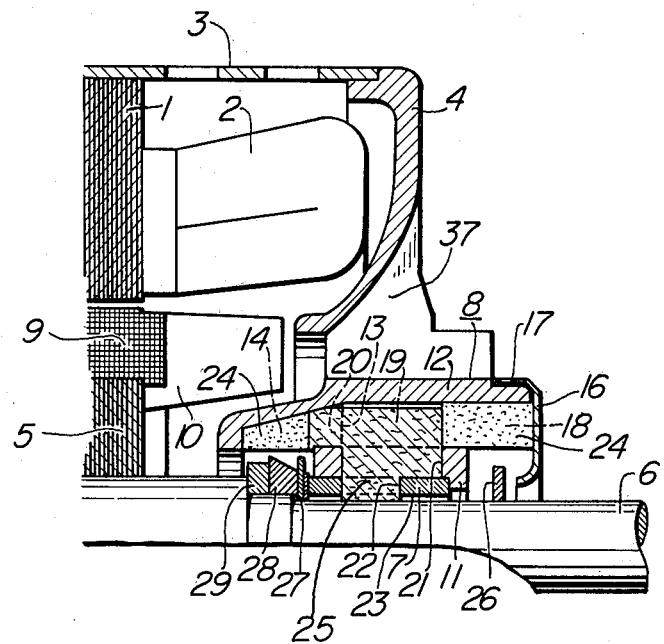
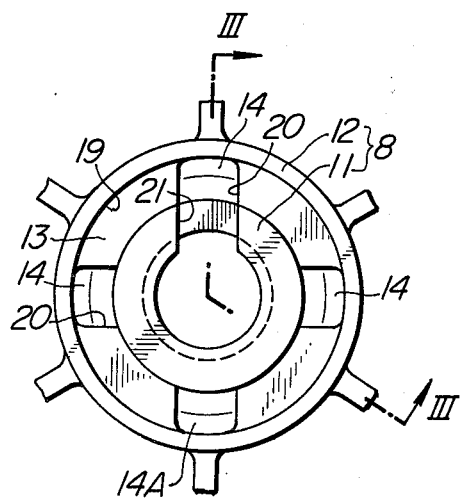
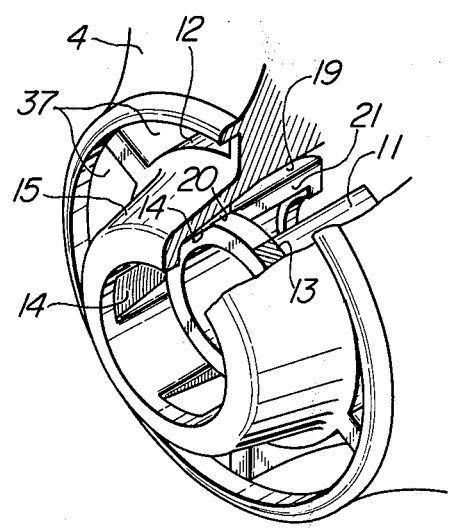

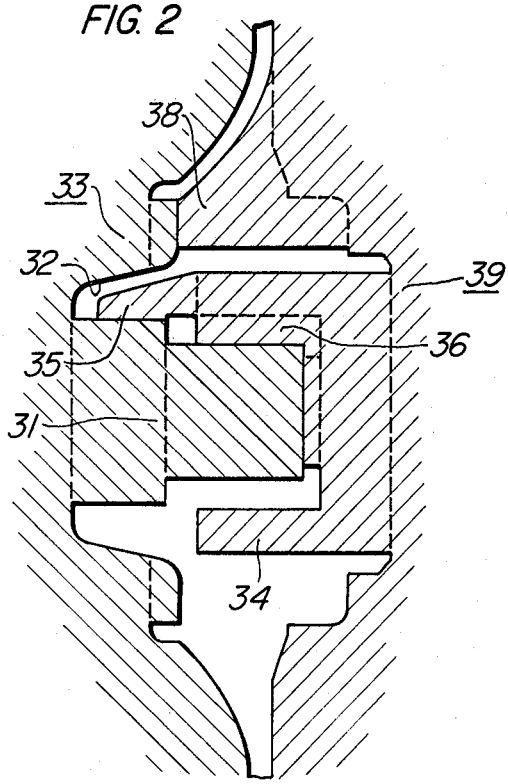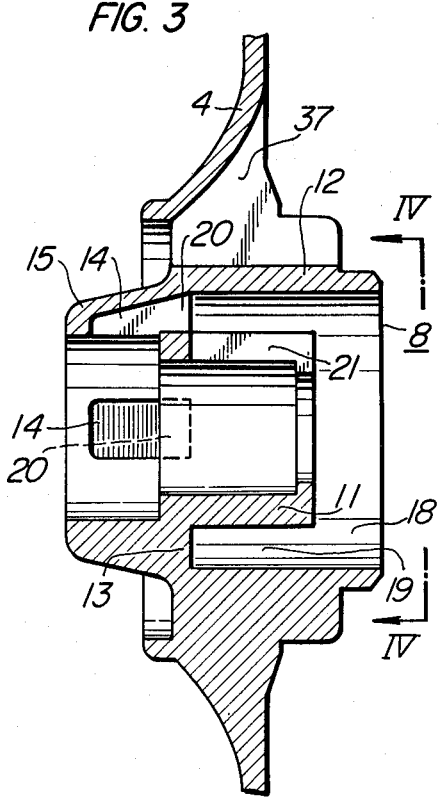

BEARING DEVICE FOR ROTARY MACHINES

BACKGROUND OF THE INVENTION

1. Field of the Invention

The present invention relates to a bearing device for rotary machines, such as small-sized electric motors and, more particularly, to a bearing device having a sleeve bearing for rotary machines.

2. Description of the Prior Art

A bearing device for small-sized electric motors has a sleeve bearing on a bearing support member of an end bracket, and a rotary shaft is rotatably supported through the sleeve bearing.

Such a bearing support member is double-annularly constructed, which consists of an inner annular portion and an outer annular portion as shown in U.S. Pat. No. 3,224,819, and these annular portions are joined together at the axially inside sections thereof.

The sleeve bearing is press-fitted into the inner annular portion so as to be fixed therein. A cap made of a steel plate is press-fitted around both axial end sections of the outer annular portion via a sealing adhesive coated on the cap so as to prevent oil leak from the caps. These caps thereby form inside and outside annular reservoirs, in which felt or an oil-containing fibrous material is inserted.

In a bearing device having the above-described construction, the lubricating oil contained in the felt or oil-containing fibrous material provided in the inside and outside oil reservoirs is introduced into the felt inserted in an annular cavity provided between the inner annular portion and outer annular portion, and oil feed bores provided in the inner annular portion and sleeve bearing. Ths lubricating oil is then supplied to the rotary shaft supporting portion of the inner circumferential surface of the sleeve bearing, lubricating oil being supplied therefrom to the outer surface of the rotary shaft.

A conventional bearing of the above-described construction has as mentioned above inside caps made of a steel plate separately from the end bracket and press-fitted into the outer annular portion of the bearing support member. A sealing adhesive is coated on the caps for the prevention of oil leak therefrom to thereby form an inside oil reservoir. Accordingly, such a bearing device has a large number of parts. Moreover, the press-fitting of caps and the coating of a sealing adhesive are required. This causes an increase in the number of assembling steps and manufacturing cost.

SUMMARY OF THE INVENTION

An object of the present invention is to eliminate the drawbacks encountered in a conventional bearing device.

Another object of the present invention is to provide a bearing device having a reduced number of parts and capable of being manufactured by a reduced number of assembling steps at a low cost.

Still another object of the present invention is to provide a bearing device having an annular projection which is provided with a plurality of inside oil reservoirs in the inside circumferential portion thereof and which is formed integrally with an end bracket by die casting, to thereby prevent oil leak from the inner portion of a bearing support member.

To these ends, the present invention provides a bearing device comprising a sleeve bearing, a bearing support member for supporting the sleeve bearing, an oil reservoir provided at least on the axially inner side of the bearing support member, an oil containing material provided in the oil reservoir, oil returning bores communicated with the oil reservoir formed in the bearing support member, an oil guide material provided at least at a part thereof in the oil returning bore and contacting the oil-containing material so as to guide a lubricating oil stored in the oil-containing material to a rotary shaft supporting surface of the sleeve bearing, and an oil slinger for returning to the oil-containing material the lubricating oil flowing to the axially inner side of the rotary shaft, the oil reservoir being formed integrally with the bearing support member by die casting in the form of a groove in the same circumferential position as the oil returning bores, to thereby omit inside caps and reduce the number of parts and the number of manufacturing steps.

The above and other objects as well as advantageous features of the invention will become clear from the following description of the preferred embodiment taken in conjunction with the accompanying drawings.

BRIEF DESCRIPTION OF THE DRAWINGS

FIG. 1 is a longitudinal sectional view of a bearing device embodying the present invention and applied to a small-sized electric motor;

FIG. 2 is a cross-sectional view of a die casting mold for use in forming an end bracket shown in FIG. 1;

FIG. 3 is a cross-sectional view taken along the line III—III in FIG. 4, showing a principal portion of the end bracket formed by the die casting mold illustrated in FIG. 2;

FIG. 4 is a side elevational view of a bearing support member of the end bracket shown in FIG. 3, which is taken from the side IV—IV in FIG. 3; and FIG. 5 is a perspective view of a support member attached to the end bracket shown in FIG. 3, which is observed from the left side of FIG. 3.

DETAILED DESCRIPTION OF THE PREFERRED EMBODIMENT

An embodiment of the present invention will be described with reference to the accompanying drawings.

Referring to FIG. 1, which is an enlarged longitudinal sectional view of a bearing device embodying the present invention and applied to a small-sized electric motor, a stator core 1 has a winding 2 and is fixedly press-fitted in a cylindrical housing 3. The housing 3 is supported at both ends thereof on an end bracket 4.

A rotor core 5 is disposed in opposition to the inner circumferential surface of the stator core 1. The rotor core 5 is press-fitted around a shaft 6 to be rotatably supported on a bearing support member 8 of the end bracket 4 via a sleeve bearing 7. The rotor core 5 has a cage type winding 9 of aluminum and a rotor fan 10, which are integrally formed.

The bearing support member 8 of the end bracket 4 is double-annularly constructed; and consists of an inner annular portion 11 and an outer annular portion 12. These annular portions are joined together at the axially inside sections thereof with connector walls 13.

The sleeve bearing 7 is fixedly press-fitted on the inner circumferential surface of the inner annular portion 11. An inside annular projection 15 having in the inner circumferential surface thereof four groove type inside oil reservoirs 14 is formed at the inside end section of the outer annular portion 12. The inside annular projection 15 is integrally formed with the bearing support member of the end bracket 4 by die casting. A cap 16 made of a steel plate is press-fitted around the outer circumferential surface of the end section of the outer annular portion 12 via a sealing adhesive 17 coated on the cap so as to prevent oil leak from the cap 16. The outer annular portion 12 and the cap 16 define an outside annular oil reservoir 18 therebetween.

An annular cavity 19 is formed between the inner and outer annular portions 11, 12. The annular cavity 19 is communicated with the inside oil reservoirs 14 via a plurality of (four) oil returning bores 20 formed in a spaced manner through the connector walls 13. The annular cavity 19 is also communicated with a rotary shaft supporting surface 23 of the sleeve bearing 7 via oil feed bores 21, 22 provided in the intermediate sections of the inner annular portion 11 and sleeve bearing 7.

An oil-containing fibrous material 24 is in inserted in the inside oil reservoirs 14 and outside oil reservoir 18, and felt 25 is inserted in the annular cavity 19, oil returning bores 20 and oil feed bores 21, 22.

An outer oil slinger 26 is provided on that portion of the rotary shaft 6 which is opposed to the outer oil reservoir 18, and a thrust washer 27, an inner oil slinger 28 and a collar 29 are provided on that portion of the rotary shaft 11 which is opposed to the inside oil reservoirs 14.

The groove type inside oil reservoirs 14 are aligned with the oil returning bores 20 with respect to the circumferential surfaces of the inner and outer annular portions 11, 12 so that oil reservoirs 14 are linearly communicated with the oil returning bores 20.

One of the inside oil reservoirs 14 is provided in the vertically lowest portion of the bearing support member 8. The oil thrown by the inner oil slinger 28 and deposited on the inner circumferential surface of the inside annular projection 15 drops by its own weight along the inner circumferential surface of the projection 15 to naturally gather in the lowest inside oil reservoir 14A.

In a bearing device according to the present invention which is constructed as described above, the lubricating oil contained in the fibrous material 24 inserted in the inner and outer oil reservoirs 14, 18 is supplied to the felt 25 inserted in the annular cavity 19, oil returning bores 20 and oil feed bores 21, 22, the lubricating oil being then supplied to the rotary shaft supporting surface 23 of the sleeve bearing 7.

The oil introduced to the rotary shaft supporting surface 23 of the sleeve bearing 7 flows along the outer surface of a rotary shaft 6 toward the axial inner and outer sides thereof. The oil flowing to the inner side of the rotary shaft 6 is thrown outwardly radially by the inside oil slinger 28, while the oil flowing to the outer side of the rotary shaft 6 is thrown outwardly radially by the outside oil slinger 26. The resulting oil is returned to the fibrous material 24 inserted in the inside and outside oil reservoirs 14, 18.

The lubricating oil is supplied to the rotary shaft supporting portion 23 of the sleeve bearing 7 through the circulation passage described above so that the consumption of lubricating oil can be minimized.

In order to form the annular projection 15, which defines the inside oil reservoirs 14, in a bearing device according to the present invention integrally with the bearing support member 8 of the end bracket 4, a die casting mold, for example, one shown in FIG. 2 is used.

The die casting mold shown in FIG. 2 consists of a stationary die casting part 33 having a projection 31 for forming the cavity inside the inner annular portion 11, cavity inside the inside annular projection 15, and a recess 32 corresponding to the outer circumferential surface of the inside annular projection 15; and a movable die casting part 39 having an annular projection 34 for forming the annular cavity 19 in the bearing support member 8, four axially extending projections 35 for forming the oil returning bores 20 and inside oil reservoirs 14, an inwardly radially extending projections 36 for forming the oil feed bore 21, and a projection for forming an air vent 37 in the end bracket 4. A molten metal material, such as aluminum is injected into a gate (not shown) provided in the stationary die casting part 33 to form an end bracket 4 having a bearing support member 8 as shown in FIGS. 3–5.

Therefore, a bearing device according to the present invention permits an excellent supplying of a lubricating oil to the rotary shaft supporting surface 23 of the sleeve bearing 7 through an oil circulation passage. Since the bearing device is provided with an inside annular projection 15 which has groove type inside oil reservoirs 14 in those circumferential portions thereof which are opposed to the oil returning bores 20 and which is integrally formed with the end bracket 4, the inner caps which are essentail to a conventional bearing device of this kind can be omitted. Accordingly, the press-fitting of inside caps and the coating of a sealing adhesive on the inside caps are not required in the present invention. This allows the number of parts and the number of manufacturing steps to be reduced to a great extent.

Since the inside annular projection 15 is integrally formed with the end bracket 4, oil leak from the press-fitting portions of the inside caps as in a conventional bearing device never occurs in a bearing device according to the present invention. In addition, the groove type inside oil reservoirs 14 are formed in the same circumferential positions as the oil returning bores so as to be linearly communicated therewith. Consequently, the inside oil reservoirs and oil returning bores can be formed easily by the die casting parts 33, 39 as shown in FIG. 2.

The present invention is not, of course, limited to the above-described embodiment; it may be modified in various ways within the scope of the appended claims.

What is claimed is:

1. A bearing device for rotary machines, comprising a sleeve bearing, a bearing support member for supporting said sleeve bearing, oil reservoirs provided at least on an axially inner side of said bearing support member oil-containing materials provided in said oil reservoirs, oil returning bores communicated with said oil reservoirs formed in said bearing support member, oil guide members at least a part of which are provided in said oil returning bores so as to contact said oil-containing materials to thereby introduce lubricating oil stored in said oil-containing materials to a rotary shaft supporting surface of said sleeve bearing, and an oil slinger provided on the rotary shaft for returning to said oil-containing materials the lubricating oil flowing out in the direction of the axis of the rotary shaft, each of said oil reservoirs provided on the axially inner side of said bearing support being in the form of a groove, said oil reservoirs being provided in substantially the same circumferential positions as said oil returning bores, said oil reservoirs being formed integrally with said bearing support member by a die casting mold.

2. A bearing device for rotary machines according to claim 1, wherein said device includes, on the axially inner side of said bearing support member an inside annular projection which has a plurality of groove type oil reservoirs and which is formed integrally with said bearing support member, produced by a die casting mold.

3. A bearing device for rotary machines according to claim 2, wherein said groove type oil reservoirs are linearly communicated with said oil returning bores formed in said bearing support member.

4. A bearing device for rotary machines according to claim 2, wherein at least one of said groove type oil reservoirs is provided in a vertically lowest portion of said bearing support member to thereby permit the lubricating oil deposited on an inner cicumferential surface of said inside annular projection to drop by its own weight therealong such that the lubricating oil is thus collected in the lowermost oil reservoir.

* * * * *